Feb. 7, 1950  LA VERGNE H. WILLIAMS  2,496,686
ELAPSED TIME RECORDER WITH STRIP PRINTING TYPE
Filed June 30, 1945  3 Sheets-Sheet 1
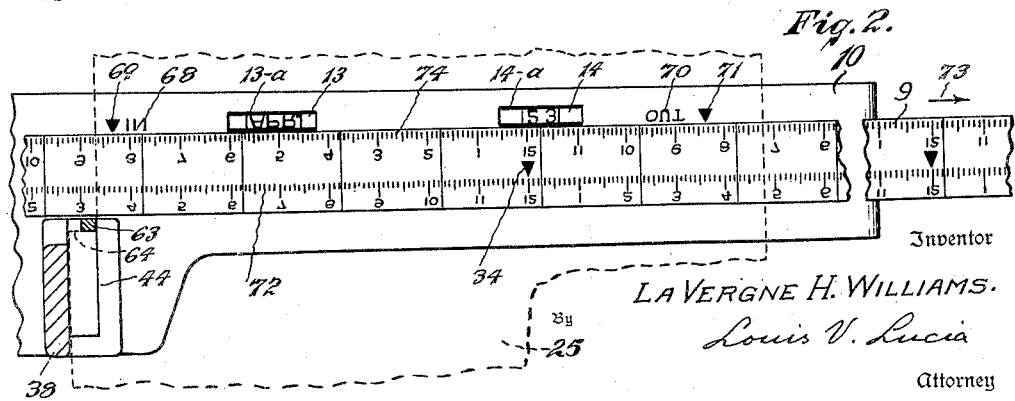

Feb. 7, 1950 LA VERGNE H. WILLIAMS 2,496,686
ELAPSED TIME RECORDER WITH STRIP PRINTING TYPE
Filed June 30, 1945 3 Sheets-Sheet 2
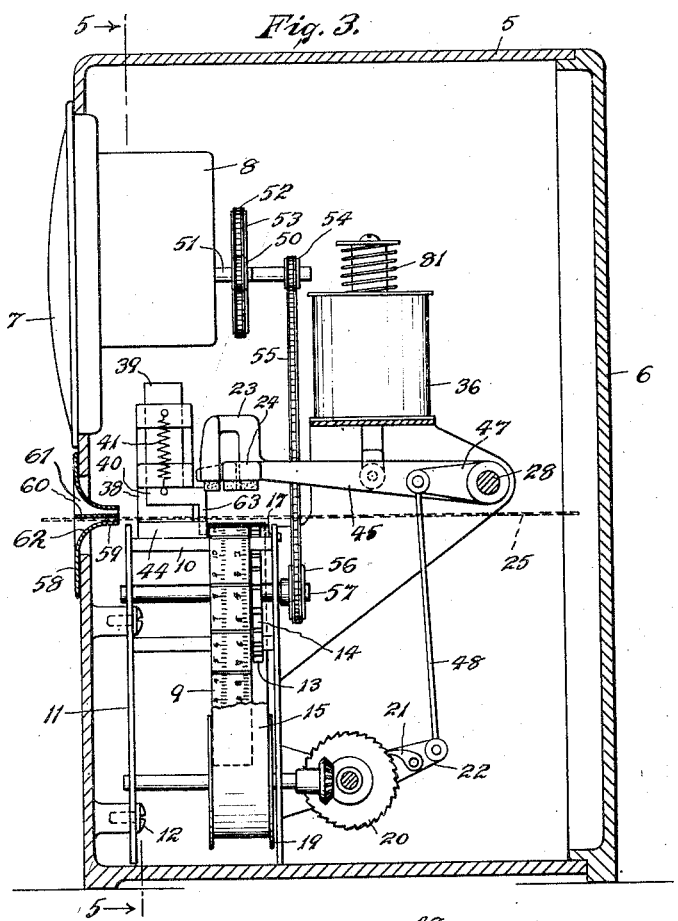
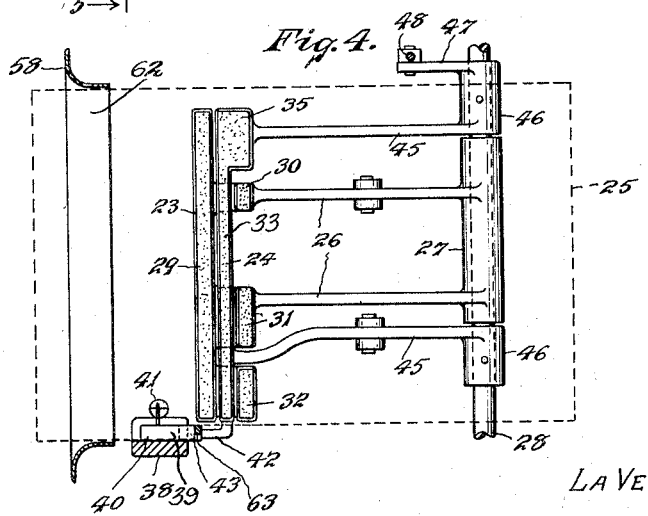
Inventor
LA VERGNE H. WILLIAMS.
By Louis V. Lucia
Attorney Feb. 7, 1950 LA VERGNE H. WILLIAMS 2,496,686
ELAPSED TIME RECORDER WITH STRIP PRINTING TYPE
Filed June 30, 1945 3 Sheets-Sheet 3
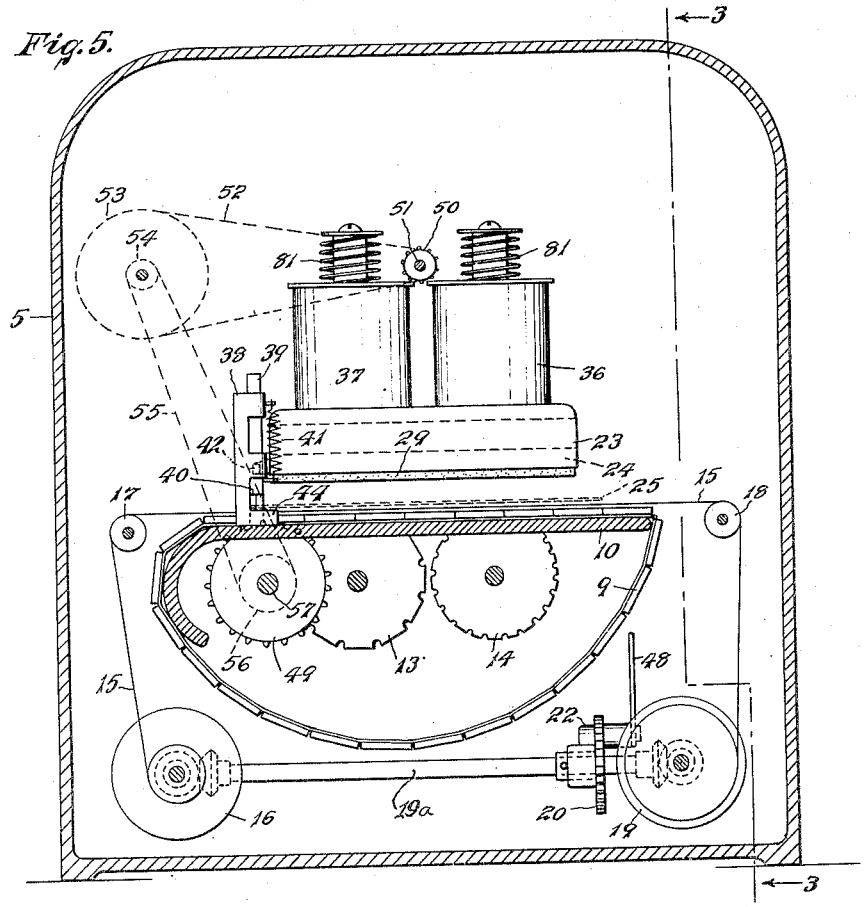
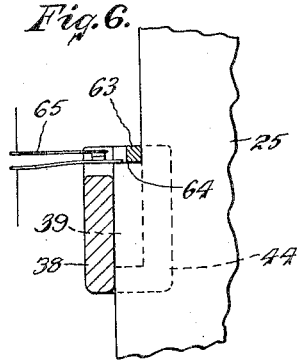
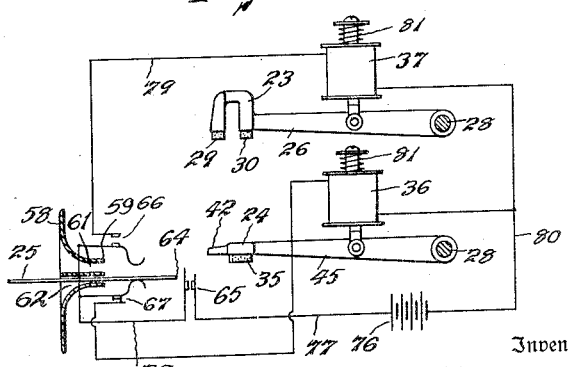
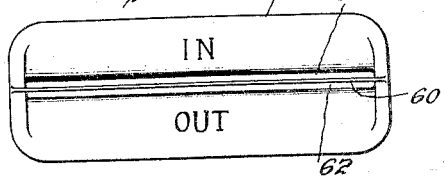
Inventor
LA VERGNE H. WILLIAMS.
By Louis V. Lucia
Attorney Patented Feb. 7, 1950

2,496,686

UNITED STATES PATENT OFFICE 2,496,686

ELAPSED TIME RECORDER WITH STRIP PRINTING TYPE

La Vergne H. Williams, Columbia, Conn., assignor to Collins and Williams Company, Incorporated, Willimantic, Conn., a corporation of Connecticut Application June 30, 1945, Serial No. 602,457

10 Claims. (Cl. 346—82)

1

This invention relates to time recorders and more particularly to time clocks.

The primary object of my invention is to provide a time recorder which is adapted to record the elapsed time between a first and a second recording operation, performed relatively at the starting and stopping time of the worker, and also to provide a novel method for recording said expired time.

A further object of the invention is to provide such a time recorder which is adapted to record the starting time, the stopping time and, in addition thereto, the elapsed time between the starting and the stopping, or the "In" and the "Out" times.

Further objects and advantages of this invention will be more clearly understood from the following description and from the accompanying drawings in which—

Fig. 1 is a plan view of a time card used in connection with my invention.

Fig. 2 is a diagrammatical plan view in elevation, with parts broken away, showing the stamping and card positioning mechanism used in my invention.

Fig. 3 is a side view, in section on line 3—3 of Fig. 5, of the time recording mechanism embodying my invention.

Fig. 4 is a bottom view, partly in section, showing the stamping pads and the card positioning means used in said mechanism.

Fig. 5 is a front view in section on line 5—5 of Fig. 3.

Fig. 6 is a fragmental plan view, partly in section, of the positioning mechanism.

Fig. 7 is a diagrammatic view showing the electric circuit used for controlling the operation of said mechanism.

Fig. 8 is a front view, in elevation, showing the card receiving and positioning slots at the front of my improved recorder.

As illustrated in the drawings, my invention provides a recording mechanism which may be contained in a suitable casing 5 having a door, or cover, 6 and a clock 7 with a suitable timing mechanism contained within the casing 8.

The time recording mechanism, as shown, may include printing type, preferably carried on a plurality of links joined into a chain 9 and supported upon a table 10 in a suitable frame 11 which may be mounted in the casing 5 in any desired manner, such as by means of screws 12.

The said mechanism may also include a suitable type wheel 13 having type for printing the months of the year and another type wheel 14

2 having type for printing the days of the month. These wheels may be mounted within the frame 11 in any suitable manner and the positioning thereof may be controlled either by the recording mechanism or by hand.

An inking ribbon, indicated at 15, is provided over that portion of type chain 9 which is on the table 10 and the said ribbon extends from a reel 16, over the supporting roll 17, over the table 10, over the supporting roll 18 and onto the reel 19. If desired, a suitable ribbon winding mechanism, which may include a drive shaft 19—a with a rachet wheel 20 and a pawl 21 on a lever 22, may be used for moving said inking ribbon from one reel to the other over the type 9 and the type wheels 13 and 14. The shaft 19—a may be shifted endwise, as commonly done in typewriters or the like, for reversing the direction of travel of said ribbon after the winding reel has become full and the ribbon is to be wound back onto the empty reel.

I provide a plurality of stamping hammers 23 and 24, over said type chain 9, type wheels 13 and 14 and inking ribbon 15, which are adapted to press a suitable time card 25 against the ribbon for recording impressions, on said card, from the type on the chain 9 and wheels 13 and 14. The hammer 23 is carried on a double lever 26 having a hub 27 by means of which it is pivotally mounted upon a supporting shaft 28. The said hammer 23 has a series of resilient pads mounted thereon which include the pad 29 for striking over the elapsed time row of type on the chain 9, the pad 30 for striking over the day number type wheel 14, the pad 31 for striking over the month type wheel 13, and the pad 32 for striking over the "In" or the starting portion of the type on the said chain 9 and table 10. The hammer 24 carries the pad 33 for striking over the elapsed time indicating pointer 34 (Fig. 2), which is carried on the chain 9, and the said pad 33 has an enlarged portion 35 for also striking over the "Out" portion of the type on the chain 9 and table 10.

The hammer 23 is preferably operated by a solenoid 37 and the hammer 24 is operated by a similar solenoid 36, as will be more fully hereinafter described.

In order that the time card 25 may be properly positioned for each consecutive day, or each consecutive job to be recorded on said time card, I provide a suitable cutting mechanism having a frame 38 mounted upon the table 10 and a plunger 39 vertically movable in said frame and having a cutting end 40 for cutting off a portion of the card advance a leading edge portion thereof which provides an abutment on said card.

The said plunger 39 is normally retained in raised position by means of a spring 41 and is actuated by means of an extension 42, on the hammer 24, which engages the top of the projection 43 on the cutting end 40, upon the operation of said hammer, and forces the plunger into a cutting die portion 44 on the frame 38; the said hammer 24, being pivotally mounted upon the shaft 28 by means of levers 45—45 having hubs 46—46 secured to said shaft 28 to rotate therewith. One of said hubs has an extension 47 for operating the lever 22 through a connecting bar 48 and actuating the inking ribbon forwarding mechanism with each operation of the said hammer 24.

The type chain 9 is maintained in motion by means of a toothed wheel 49 which is in mesh with suitable indentations (not shown) on the bottom of the chain and is driven by the clock mechanism in the case 8 through a sprocket 50 on a shaft 51 which extends from the clock mechanism, a chain 52, a sprocket 53, a reducing sprocket 54, and a chain 55 which is in mesh with a sprocket 56 on the shaft 57 on which the said toothed wheel 49 is mounted.

At the front of the casing 5, I provide an escutcheon plate 58 which has upper and lower slots 61 and 62, respectively, extending across the same for guiding the time card 25 into proper position in the recording mechanism, as clearly illustrated in Fig. 3. The said escutcheon plate has an inwardly projecting funnel portion 59 forming an elongated slot which extends across the plate and is divided by a plate 60 to provide the upper slot 61 and the lower slot 62.

In order to accurately position the time card 25 within the recording mechanism, the plunger 39 is provided with a stop 63, as clearly illustrated in Fig. 6, which is engaged by the abutment 64 provided by the leading edge portion that is advanced on the time card each time that the above described cutting mechanism is operated when the card is inserted in the "Out" slot for a recording operation.

For controlling the operation of the said recording mechanism, there is provided an electric circuit which includes an electric switch, indicated at 65, that is adjacent to the stop 63 and is adapted to be operated by the leading edge 64 of the time card as will be hereinafter described. The said circuit further includes switches 66 and 67 for closing the circuit through one of the solenoids 36 or 37, in accordance with whichever of the slots 61 or 62 the card 25 is inserted into.

As will be clearly seen in Fig. 2 of the drawings, there is also provided, upon the table 10, an "In" type 68 with an adjacent pointer type 69, which are located at one end of the table. Both of said "In" and "Out" types and their adjacent pointer types are located in line with the month type, on the wheel 13, and the "Day" type, on the wheel 14, which project through respective slots 13—a and 14—a in said table.

As will also be clearly seen from Fig. 2 of the drawings, the type chain 9 is provided with a first line of printing type which includes the graduations 72 running along the side of the chain 9. These graduations denote hours and tenths of hours and are numbered from one to twelve in a direction corresponding to the direction of travel of said chain, which is indicated by the arrow 73. Along the other side of said chain and adjacent to the indicating arrows 69 and 71, there is provided a second line of printing type including graduations 74 which are numbered from one to twelve in a direction opposite to the direction of the numbering of the row of type which includes the graduations 72. Also, the said rows of graduations 72 and 74 are so numbered that the numbers "12" in each of said rows are in register and an elapsed time pointer 34 is provided on the type chain adjacent the number "12" in the row 72.

The clock mechanism, in the case 8, may be of any suitable type but a synchronous clock mechanism which is electrically driven is preferably used. Assuming that said clock is in operation, the shaft 51 thereof will rotate the toothed wheel 49 so as to continuously move the type chain 9 upon the table 10 in the direction of the arrow shown at 73 in Fig. 2 and in synchronism with the clock mechanism so that the said chain will register the time of the day on the position of the row of type 74 and the pointers 69 and 71, in accordance with the time shown upon the clock 7. Although it is preferred that such a clock should show the time of the day, this is not necessary since the time need not be shown on the clock and the time mechanism within the case 8 may still move the type chain 9 so as to register the correct time of the day at the pointers 69 and 71.

The operation for recording time upon the time card 25 is as follows:

Starting to work with a new time card, which will be notched with its leading edge 64 at the position of the dotted line 75, the operator inserts the card in an inverted position into the slot 61, which is identified as the "In" slot, for a first recording operation. As the card passes through the funnel portion 59, it will close the switch 66 and continue moving inwardly until the leading edge 64, now at 75 in Fig. 1 strikes the top 63. At this time, the said leading edge will close the switch 65 so that the circuit will flow from the source of electric current indicated at 76, through the conductor 77, the switch 65, the conductor 78, the switch 66, and the conductor 79 to the solenoid 37, and from said solenoid back through the conductor 80 to the other side of the source 76. This will cause the solenoid 37 to become energized and operate the hammer 23 by pushing downwardly on the lever 26 against the tension of a spring 81. This operation of the hammer 23 will cause the stamping pads 29, 30, 31 and 32 to strike upon the corresponding portions of the time card 25, in the first or lowermost zone dated April 20, and press said card downwardly upon the inking ribbon 15 over the portions of the type on the chain 9 which include only the elapsed time row of graduations 72, a short portion of the row of type 74 opposite the type "In," the indicating pointer 69 and the date type at the tops of the type wheels 13 and 14 and cause said portion of the type to be imprinted upon the card. The portion of the row of type 72 which is imprinted on the card at this time, as indicated at 72' in Fig. 1, will provide a preliminary impression for the elapsed time computation which will be recorded on the card at the end of the work period, or when work on the job is stopped, as will be hereinafter described. The portion of the row of type 74 and the pointer 69 which is also imprinted at this time, as indicated at 74' and 69 in Fig. 1, indicates the actual time of the day that the card was stamped by being inserted in the "In" slot 61, at the beginning of the work period, or at the start of the job.

It is to be remembered that the type chain 9, being continuously in mesh with the clock 7, is also continuously in register with the actual time of the day; therefore, the portion 72' of the preliminary impression made upon the card 25 at the beginning of the work period provides a scale which corresponds to the particular starting, or "In," time and on which will be indicated the elapsed time when the card is again stamped at the end of the work period.

It is also to be noted that, at the times when the impressions 72' are made upon the card, the pointer 34 on the type chain 9 is in the zero position opposite the hour twelve of the impression, but the impression of the said pointer is not made upon the card at those times.

During the period between the "In" and "Out" stamping operations upon the card, the type chain 9 will continue its movement in the direction of the arrow 73 and carry the pointer 34 towards and in the direction of hour numbers (1), (2), etc. Therefore, it will be seen that, after the preliminary impression 72' is made upon the card, the pointer 34 will continue to travel with the type chain 9 so that it moves with relation to the said impression and thereby compute the time as it elapses.

When the job is complete, or at the end of the work period the worker inserts the card in the "Out" slot 62, for the second and final recording operation, and this causes the card to close the switch 67. As the card is moved inwardly, the leading edge 64 closes the switch 65 and engages the stop 63. The current will then flow from the source 76, through the conductor 77, the switch 65, the conductor 78 and the switch 67, to the solenoid 36, from which the said current will flow back through the conductor 80 to the other side of the source 76. The solenoid 36 will then become energized and rock the lever 45 of the hammer 24 downwardly, causing the pad 33 and the enlarged portion 35 thereof to strike the card over the portions of the type on the chain 9 which include the elapsed time pointer 34, a portion of the row of type 74 adjacent to the type "Out," as at 70, and the "Out" pointer type 71. The recording operation on the card is now complete and the impression 34' of the pointer type 34 will indicate, upon the impression 72', the elapsed time in hours and tenths of hours, the "In" time and the "Out" time, as well as the month and the day, and thus providing a complete record which can be used, at the finish of a job or week, for quickly computing the total hours worked by the person having the particular card.

At the same time that the hammer 24 is operated for the "Out" impression upon the card, the extension 42 on said hammer will strike the projection 43 on the plunger 38 and move said plunger downwardly against the tension of the spring 41 and cause the cutter 40 to cut off a portion of the margin of the card following the leading edge 64. Thus a piece of the card will be cut off at each "Out" operation, as indicated by the dotted lines at 84 so that, at the next "In" operation, the next line for the card will be positioned for stamping on the following day. It is to be understood that the card, as originally provided, is notched in the margin up to the dotted line 75 so as to properly position it for the first "In" operation.

It is also to be understood that, after either solenoid 36 or 37 has operated to force its respective stamping hammer 23 or 24 downwardly, and the circuit has been broken by the opening of the switch 65, the respective spring 81 will return its solenoid plunger to its raised position and thereby return the hammer to its normal position.

From the above description, it will be understood that I have provided a time recording device, or time clock, which will accurately record, upon a suitable card, the starting time, the stopping time, and the in-between elapsed time, all with a recording operation which requires only that the card be inserted in a certain slot at the beginning of a period and in another slot at the end of the period.

The time card, as shown in Fig. 1, may be in any desired form and may be made as long as necessary in order to accommodate the number of recordings, the number of jobs, or the number of periods which are to be stamped thereon.

It will be further understood that, since the row of type 74 is numbered in an inverse direction, the impressions for the "In" and "Out" times are read in an inverse direction as may be clearly seen from Fig. 1.

I claim:

1. A time recording device of the character described comprising a stamping mechanism having printing type, and means for selectively impressing a portion of said type upon a time card inserted in said mechanism; said stamping mechanism including a hammer for causing the impression of a portion of said type upon a card, a separate hammer for causing the impression of a different portion of said type on the card, and means including an electric circuit for selectively controlling the operation of said hammers; said controlling means including a plurality of slots through which said card may be inserted for conditioning said circuit for the operation of either of said hammers, an electric switch in said circuit operable by the insertion of the card through one of said slots for conditioning said circuit for the operation of one of said hammers, a separate electrical switch operable by the insertion of said card through another of said slots for conditioning the circuit to cause the operation of another of said hammers, and a single switch in said circuit operable by said card upon the insertion thereof into said mechanism through either of the slots for closing said circuit to cause operation of the selected hammer.

2. A time recording device for recording starting and stopping times and the elapsed time therebetween; said device including a stamping mechanism having a strip of printing type, means for retaining said strip continuously in timed movement in one direction, the type on said strip including a first line of time denominations reading in the direction of said movement, a second line of time denominations parallel to the first line and reading in an opposite direction, means for simultaneously stamping upon a card different portions of type, and means for separately stamping upon said card other portions of said type for indicating starting time, stopping time, and the elapsed time therebetween.

3. A time recording device having stamping mechanism including movable printing type, means for imprinting portions of said type upon a sheet, guide means including a plurality of slots for locating said sheet, means operable when the said sheet is inserted in one of said slots for causing a portion of said type to be imprinted upon the sheet, means operable when the said sheet is inserted in another of said slots for causing a different portion of said type to be imprinted on the sheet, and common stop means for positioning the sheet in said mechanism regardless of which slot said sheet is inserted through.

4. A time recording device comprising a mechanism having printing type, means for positioning a time card in said mechanism including a plurality of slots and a stop member, first stamping means operable for causing certain portions of said type to be imprinted upon said card when it is inserted into one of said slots, second stamping means operable for causing other portions of said type to be imprinted upon the card when it is inserted into another of said slots, an electric circuit in said device, a first electric switch operable upon the card being inserted into one of said slots for conditioning said circuit for the operation of the said first stamping means, a second electric switch operable upon the card being inserted into another of said slots for conditioning the circuit for the operation of the said second stamping means, and a separate switch in series with said first and second switches and operable upon the card being inserted into either of said slots for closing said circuit and causing the operation of the respective stamping means.

5. A time recording device comprising mechanism having lines of printing type in timed motion and including a first line of type for denoting elapsed time, an elapsed time pointer in fixed position relatively to said first line of type, a second line of type representing starting and stopping times, a starting time stationary pointer associated with a portion of said second line of type, a stopping time stationary pointer associated with a different portion of said second line of type, means operable in an initial operation of said mechanism for imprinting upon a card a portion of said first line of type which corresponds to the actual time of said initial operation and also imprinting upon said card a corresponding portion of said second line of type and the said starting time pointer to indicate upon the imprinted portion of the second line of type the time of said initial stamping operation, and means operable in a second stamping operation of said mechanism for imprinting upon the card a corresponding different portion of said second line of type and the said stopping and elapsed time pointers to indicate the time of the second stamping operation and the elapsed time between the said initial and second operations.

6. A time recording device including mechanism having lines of printing type retained in motion by a time clock; the said type including a first line of units denoting elapsed time, a second line of units in reverse order to the first line denoting starting and stopping times, means operable in an initial operation of said mechanism for imprinting upon a card a portion of said first line of type and a portion of said second line of type for imprinting upon the card the time of the said initial operation and providing a scale on said card for the computation of elapsed time, and means operable in a second operation of said mechanism for imprinting a pointer adjacent to said scale and also imprinting upon the card a different portion of the second line of type for indicating the time of the said second printing operation and the elapsed time between the initial and second operations of the mechanism.

7. A time recording device comprising mechanism for recording elapsed time between a starting and stopping time, the said mechanism including jointly movable parallel lines of printing type consisting of a first line of type for denoting elapsed time, a pointer in fixed position adjacent to a zero position on said first line of type and moveable therewith, a second line of type for denoting the starting and stopping times, separate stationary pointers adjacent to separate portions of the said second line of type, and means for imprinting said stationary pointers adjacent to impressions of different portions of said second line of type for indicating upon a card the times of an initial and a second operation of said mechanism and for also imprinting the said moveable pointer adjacent to an impression of a portion of the said first line of type to indicate the elapsed time between the said initial and second operations of the mechanism.

8. A time recording device comprising a mechanism including a chain of printing type in movement with a clock mechanism and including a line of type having time denominations reading in the direction of movement of said chain, a line having similar denominations but reading in a direction opposite to that of the movement of said chain, means operable in an initial operation of said mechanism for imprinting portions of said lines of type upon a card to provide an elapsed time scale and an indication of the time of the said initial operation, and means operable during a second operation of said mechanism for imprinting a pointer opposite to the elapsed time scale on said card and a portion of the said second line of type to indicate the elapsed time between the initial and second operations and the time of the second operation.

9. A time recording device of the character described comprising a mechanism including a movable chain of printing type, a clock mechanism for moving said chain in one direction, said type including a first line of time denominations having a zero point and reading in the direction of the movement of said chain, a second line of time denominations reading in a direction opposite to that of the said first line, an elapsed time indicating pointer opposite the said zero point and movable with the first line, a stationary pointer located at one point opposite said second line of type, a separate stationary pointer located at a different point opposite the said second line of type and at a distance from the first stationary pointer equal to the length of a series of time denominations on said line of type, means operable in an initial stamping operation of said mechanism for imprinting upon a card a portion of the first line of type, a portion of the second line of type with the stationary pointer adjacent thereto to indicate the actual time of the said initial stamping operation, and means operable in a second operation of said mechanism for imprinting the said elapsed time pointer upon said card in the position it occupies at the time of the second operation relatively to the imprinted portion of the said first line of type to indicate, upon the said imprinted portion the elapsed time between the said first and second operations and for also imprinting a portion of said second line of type together with its adjacent stationary pointer to indicate the stopping time on said card.

10. A time recording device comprising mechanism as set forth in claim 5 wherein the said elapsed time pointer is in fixed position adjacent to a zero position on the said first line of type and movable therewith.

LA VERGNE H. WILLIAMS.

REFERENCES CITED

The following references are of record in the file of this patent:

UNITED STATES PATENTS

| Number | Name | Date |
|---|---|---|
| 888,069 | Dey | May 19, 1908 |
| 946,858 | McCabe | Jan. 18, 1910 |
| 981,421 | Hess | Jan. 10, 1911 |
| 1,006,968 | Meloney et al. | Oct. 24, 1911 |
| 1,215,532 | Hitchcock et al. | Feb. 13, 1917 |
| 1,300,909 | Wilson | Apr. 15, 1919 |
| 1,421,824 | Odell | July 4, 1922 |
| 1,558,743 | Merriman | Oct. 27, 1925 |
| 1,582,333 | Bryce | Apr. 27, 1926 |
| 1,752,564 | Love | Apr. 1, 1930 |